(12) United States Patent
Hofer et al.

(10) Patent No.: US 12,115,879 B2
(45) Date of Patent: Oct. 15, 2024

(54) BATTERY SYSTEM

(71) Applicant: SAMSUNG SDI CO., LTD., Yongin-si (KR)

(72) Inventors: Maximilian Hofer, Hartberg (AT); Thomas Trathnigg, Graz (AT); Werner Bergmayr, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 248 days.

(21) Appl. No.: 17/166,116

(22) Filed: Feb. 3, 2021

(65) Prior Publication Data
US 2021/0245625 A1  Aug. 12, 2021

(30) Foreign Application Priority Data

Feb. 6, 2020 (EP) ..................................... 20155827
Jan. 26, 2021 (KR) ........................ 10-2021-0010929

(51) Int. Cl.
*B60L 58/10* (2019.01)
*B60L 58/22* (2019.01)
*H02J 7/00* (2006.01)

(52) U.S. Cl.
CPC ............... *B60L 58/10* (2019.02); *B60L 58/22* (2019.02); *H02J 7/0014* (2013.01); *H02J 7/0047* (2013.01)

(58) Field of Classification Search
CPC ....... H02J 7/0014; H02J 7/0047; B60L 58/10; B60L 58/22; G01R 31/378
(Continued)

(56) References Cited

U.S. PATENT DOCUMENTS

2010/0285371 A1  11/2010  Lee et al.
2012/0004875 A1   1/2012  Maeda et al.
(Continued)

FOREIGN PATENT DOCUMENTS

CN  104094128 A  10/2014
CN  110024207 A   7/2019
(Continued)

OTHER PUBLICATIONS

Dai, et al., "Impedance Characterization and Modeling of Lithium-Ion Batteries Considering the Internal Temperature Gradient," Energies, Jan. 17, 2018.
(Continued)

*Primary Examiner* — Edward Tso
*Assistant Examiner* — Aaron Piggush
(74) *Attorney, Agent, or Firm* — Lee IP Law, P.C.

(57) ABSTRACT

A battery system for an electric vehicle includes a battery module having battery cells and a controller module connected to the battery cells, the controller module being configured to measure voltage values, current values, and temperature values of at least one of the battery cells, and a controller unit connected to the battery module and configured to communicate with the controller module via a data line, the controller unit being configured to determine an inherent physical property of the at least one of the battery cells based on the measured values of the controller module, to compare the determined inherent physical property with a reference value for the inherent physical property, and to perform an authentication of the at least one of the battery cells based on the comparison.

14 Claims, 2 Drawing Sheets (58) Field of Classification Search
USPC ............... 320/106, 132, 134, 136, 152, 153
See application file for complete search history.

(56) References Cited

U.S. PATENT DOCUMENTS

| | | | | |
|---|---|---|---|---|
| 2012/0143541 A1* | 6/2012 | Wu | ..................... | G01R 31/378 |
| | | | | 702/63 |
| 2013/0069658 A1* | 3/2013 | Rich | ..................... | G01R 31/392 |
| | | | | 324/426 |
| 2014/0117939 A1* | 5/2014 | Lim | ..................... | H01M 10/482 |
| | | | | 320/134 |
| 2014/0145685 A1* | 5/2014 | Bosch | ................ | G01R 31/3835 |
| | | | | 320/162 |
| 2014/0365065 A1* | 12/2014 | Leonard | .................. | B60L 58/10 |
| | | | | 701/29.6 |
| 2017/0219660 A1 | 8/2017 | Christensen et al. | | |
| 2019/0195957 A1* | 6/2019 | Chiba | .................. | G01R 31/367 |

FOREIGN PATENT DOCUMENTS

| | | |
|---|---|---|
| EP | 2403048 A2 | 1/2012 |
| EP | 2571076 A1 | 3/2013 |
| JP | 2014-203719 A | 10/2014 |
| WO | WO 2008/038971 A1 | 4/2008 |
| WO | WO 2018/105885 A1 | 6/2023 |

OTHER PUBLICATIONS

Wijewardana, et al., "Dynamic battery cell model and state of charge estimation," Journal of Power Sources, 308 (2016) 109-120.
Dubarry, et al., "Battery energy storage system modeling: A combined comprehensive approach," Journal of Energy Storage, 21 (2019) 172-185.
Zhao, et al., "A review on modeling of electro-chemo-mechanics in lithium-ion batteries," Journal of Power Sources, 413 (2019) 259-283.
Zhang, et al. "A Review of Li-ion Battery Equivalent Circuit Models," Transactions on Electrical and Electronic Materials, vol. 17, No. 6, pp. 311-316, Dec. 25, 2016.
Extended European Search Report dated Aug. 18, 2020 for EP Application No. 20155827.7.
European Office action dated Feb. 2, 2023, of corresponding European Patent Application No. 20155827.7.—*all references previously cited*.
Chinese Office Action dated Aug. 23, 2023 (including a search report), of the corresponding Chinese Patent Application No. 202110166325.7.

\* cited by examiner

BATTERY SYSTEM

CROSS-REFERENCE TO RELATED APPLICATION

European Patent Application No. 20155827.7, filed on Feb. 6, 2020, in the European Patent Office, and Korean Patent Application No. 10-2021-0010929, filed on Jan. 26, 2021, in the Korean Intellectual Property Office, both entitled: "Battery System," are incorporated by reference herein in their entirety.

BACKGROUND

1. Field

The present disclosure relates to a battery system, particularly to a battery system with at least one control unit configured to authenticate at least one battery cell of the battery system. The present disclosure further relates to a method of a battery system, the method including authenticating at least one battery cell based on inherent properties of the battery system.

2. Description of the Related Art

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly with a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g., cylindrical or rectangular, depends on the battery's intended purpose.

Rechargeable batteries may be used as a battery module formed of a plurality of unit battery cells coupled in series and/or in parallel so as to provide a high energy density. That is, the battery module is formed by interconnecting the electrode terminals of the plurality of unit battery cells depending on a required amount of power and in order to realize a high-power rechargeable battery. In general, one or more battery modules are mechanically and electrically integrated, equipped with a thermal management system and set up for communication with one or more electrical consumers in order to form a battery system.

For meeting the dynamic power demands of various electrical consumers connected to the battery system, a static control of battery power output and charging is not sufficient. Thus, steady or intermittent exchange of information between the battery system and the controllers of the electrical consumers is required. This information includes the battery system actual state of charge (SoC), potential electrical performance, charging ability, and internal resistance, as well as actual or predicted power demands or surpluses of the consumers.

For monitoring, controlling, and/or setting of the aforementioned information a battery system usually includes a battery management system (BMS). Such a control unit may be integral with the battery system or may be part of a remote controller communicating with the battery system via a suitable communication bus. In both cases, the control unit communicates with the electrical consumers via a suitable communication bus, e.g., a CAN or SPI interface.

The BMS is usually coupled to the controller of one or more electrical consumers as well as to each of the battery modules of the battery system. Usually, each battery module includes a cell supervision circuit (CSC) that is configured to maintain the communication with the BMS and with other battery modules. The CSC may be connected to the battery cells directly or via a cell connecting unit (CCU), and may be configured to monitor cell voltages, currents, and/or temperatures of some or each of the battery module's unit battery cells. The CSC may further actively or passively balance the voltages of the individual unit battery cells within the battery module.

SUMMARY

According to aspects of embodiments, there is provided a battery system for an electric vehicle, including a battery module having battery cells and a controller module connected to the battery cells, the controller module being configured to measure voltage values, current values, and temperature values of at least one of the battery cells, and a controller unit connected to the battery module and configured to communicate with the controller module via a data line, the controller unit being configured to determine an inherent physical property of the at least one of the battery cells based on the measured values of the controller module, to compare the determined inherent physical property with a reference value for the inherent physical property, and to perform an authentication of the at least one of the battery cells based on the comparison.

The controller unit may be further configured to determine a deviation between the reference value and the determined inherent physical property and to authenticate the at least one of the battery cells if the deviation is below a predetermined threshold.

The controller unit may be further configured to determine a deviation between the reference value and the determined inherent physical property and to identify the at least one of the battery cells as replacement battery cell, if the deviation is above a predetermined threshold.

The battery system may further include battery modules, each of the battery modules including the battery cells and the controller module, wherein the controller module in each of the battery modules is configured to measure a voltage value, a current value, and a temperature value of at least one of its battery cells, and wherein the controller unit is further configured to communicate with the controller modules of each of the battery modules via at least one corresponding data line, and to determine the reference value based on at least one inherent physical property of at least one other battery cell determined from measurement values of at least one the control modules.

The controller unit may be further configured to trigger the controller module to perform a measurement sequence of voltage, current, and/or temperature measurements of the at least one battery cell.

The measurement sequence may include voltage, current, and/or temperature measurements of at least two battery cells obtained during a predetermined time window.

The controller unit may be further configured to control a specified current draw from and/or a specified current input to the at least one battery cell during the measurement sequence.

The control unit may be further configured to control performance of an impedance spectroscopy on the at least one battery cell during the measurement sequence.

The battery system may further include a heating element thermally connected to the at least one of the battery cell, the controller unit being configured to vary a temperature of the at least one battery cell during the measurement sequence via the heating element.

The inherent physical property may include at least one of an internal resistance, an impedance, a state of charge, a state of health, and a reaction dead time of the at least one of the battery cells.

According to aspects of embodiments, there is provided a method of operating a battery system, including measuring voltage values, current values, and/or temperature values of at least one battery cell of the battery system, determining an inherent physical property of the at least one battery cell, comparing the determined inherent physical property of the at least one battery cell with a reference value for the inherent physical property, and performing authentication of the at least one battery cell based on the comparison.

The method may further include determining a deviation between the reference value and the determined inherent physical property, authenticating the at least one battery cell, if the deviation is below a predetermined threshold, and identifying the at least one battery cell as replacement battery cell, if the deviation is above a predetermined threshold.

The method may further include performing a measurement sequence of voltage, current, and/or temperature measurements of the at least one battery cell.

Performing the measurement sequence may include at least one of measuring voltage, current, and/or temperature measurements of at least two battery cells obtained during a predetermined time window, drawing a specific current from and/or inputting a specific current to the at least one battery cell, and performing an impedance spectroscopy on the at least one battery cell.

According to aspects of embodiments, there is provided a controller of a battery system that includes a battery module with battery cells and a controller module connected to the battery cells, the controller includes a control unit connected to the battery module and configured to communicate with the control module via a data line, wherein the control unit is configured to determine an inherent physical property of at least one of the battery cells based on measurement values of voltage, current, and temperature of the at least one of the battery cells obtained by the control module, to compare the determined inherent physical property with a reference value for the inherent physical property, and to perform an authentication of the at least one of the battery cells based on the comparison.

BRIEF DESCRIPTION OF THE DRAWINGS

Features will become apparent to those of skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Further, the use of "may" when describing embodiments refers to "one or more embodiments." In the following description of embodiments, the singular form may include plural forms unless the context clearly indicates otherwise.

It will be understood that if the terms "first" and "second" are used to describe elements, these elements are limited by these terms. These terms are only used to distinguish one element from another element. For example, a first element may be named a second element and, similarly, a second element may be named a first element, without departing from the scope of the embodiments. Expressions such as "at least one of," when preceding a list of elements, modify the entire list of elements and do not modify the individual elements thereof.

As used herein, the term "substantially," "about," and similar terms are used as terms of approximation and not as terms of degree, and are intended to account for the inherent deviations in measured or calculated values that would be recognized by those of skill in the art. If the term "substantially" is used in combination with a feature that could be expressed using a numeric value, the term denotes a range of +/−5% of the value centered on the value.

A battery system according to embodiments may include a battery module, i.e., at least one battery module and preferably a plurality of battery modules, connected via a high voltage (HV) line, e.g., via busbars, to provide a high voltage between a first system terminal and a second system terminal. Each battery module includes a plurality of battery cells that are preferably connected in series and/or in parallel between a first module terminal and a second module terminal of a module.

The battery system further includes a control unit that is connected to the at least one battery module, preferably to all of the plurality of battery modules, and that is configured to communicate with the control module of the battery module via a data line. Preferably, the control unit is configured to communicate with the control modules of each of the plurality of battery modules via at least one data line, e.g., in a daisy chain configuration.

In the battery system, each battery module includes a control module that is connected to the battery cells of the respective battery module and that is preferably physically connected to the battery module. The at least one control module of the battery system and preferably each of the control modules of the battery system is configured to measure voltage values, current values, and temperature values of at least one battery cell of the respective battery module, preferably of multiple battery cells of the respective module. The control modules are configured as CSCs, and the control unit of the battery system is configured as BMS.

The control unit is configured to determine an inherent physical property of at least one battery cell based on the measurement values of the control module, i.e., based on voltage, current and/or temperature values measured by a control module for a battery cell. Preferably, the control unit is configured to determine such an inherent physical property for a plurality of battery cells based on measurement values of one or more control modules for those battery cells. The control unit is either configured to determine the inherent physical property itself, i.e., to receive measurement values from at least one control module and to perform the actual calculations itself, or the control unit is configured to control at least one control module to determine the inherent physical property.

The control unit is further configured to compare the determined inherent physical property of the at least one battery cell with a reference value for the inherent physical property for the at least one battery cell. The reference value may be valid only for an individual battery cell or for a plurality of battery cells of the battery system. The control unit of the battery system is further configured to perform an authentication of the at least one battery cell based on the comparison between the determined value for the inherent physical property and the reference value for the inherent physical property. In the context of the present disclosure, performance of an authentication can lead to an authentication of the battery cell as an original battery cell or to an identification of that cell as replacement cell. The control unit is either configured to perform the steps of comparison and authentication itself or is configured to control the at least one control module to perform these steps.

Further, in the context of the present disclosure, the inherent physical property refers to an intrinsic electrical property of the at least one battery cell that is determined by the physical (and chemical) properties of the battery cell, such as, e.g., the materials and amount of the electrolyte, the electrodes, the physical dimensions, the venting properties and the like. In other words, the inherent physical properties refer to a fingerprint of the battery cell that can be determined based on measuring values of electrical current, electrical voltage, and/or temperature of the battery cell. In the context of the present disclosure, an inherent physical property of a battery cell can thus not be changed without changing the physical (or chemical) properties of the battery cell. Further, suitable inherent physical properties are sensitive even to slight amendments in the composition, dimensioning, etc., of the battery cell and are thus likely to differ apparently between an original battery cell and a replacement battery cell.

Preferably, the inherent physical property includes at least one of an internal resistance, an impedance, a state of charge (SOC), a state of health (SOH), and a reaction dead time of the at least one battery cell. Further, the inherent physical property includes the temperature dependency of one or more of the aforementioned inherent physical properties. Further, the inherent physical properties include the cross-dependency of two or more of the aforementioned inherent physical properties. Preferably, the inherent physical property includes a time-series of at least one aforementioned inherent physical property.

Different inherent physical properties provide different levels of security or reliability of battery cell authentication. For example, if a DC resistance is used, the security level of the authentication is not particularly high, as a replacement cell may have a similar DC resistance. In another example, if the SOC is used as an inherent physical property, the balancing time needed until the SOC plateaus can be determined in a time series of SOC. Such balancing time, particularly at low SOC, is a good comparative measure for identifying replacement cells that show an outlying balancing time compared to the other battery cells. In the context of the present disclosure, the reaction dead time of at least one battery cell refers to the time a battery needs to respond to any current drawn or input to the cell. Exemplarily, if a specific current is drawn from the battery cell, the terminal voltage of the cell will drop by a certain amount due to the internal resistance of the battery cell. However, this voltage drop occurs only after a reaction dead time after connecting the load to the battery cell. It was found that the reaction dead time of cells can be used to reliably authenticate a battery cell.

The control unit of the battery system is further configured to determine a deviation between the reference value and the determined inherent physical property and to authenticate the at least one battery cell if the deviation is below a predetermined (first) threshold. The threshold preferably differs for different inherent physical properties and is either pre-configured or set during operation of the battery system. Further, the control unit is configured to determine a deviation between the reference value and the determined inherent physical property and to identify the at least one battery cell as replacement battery cell, if the deviation is above a predetermined (second) threshold. The first and second thresholds may differ from each other or may be identical. The control unit is configured to perform the determination of the deviation and comparing it to a threshold itself or to control the at least one control module to perform the determination and comparing.

The control unit is further configured to communicate with the control modules of each of the battery modules via at least one data line and to determine the reference value based on at least one inherent physical property of at least one other battery cell determined from measurement values. Hence, the control unit is configured to obtain first measurement values of voltage, current, and/or temperature of a first cell and to obtain second measurement values of voltage, current, and/or temperature of a second cell different from the first cell. The control unit is then configured to determine at least one first inherent physical property of the first cell and at least one second inherent physical property of the second cell, wherein the first and second inherent physical properties are preferably of the same type and thus comparable. The control unit is thus configured to determine a certain (set of) inherent physical properties for different battery cells of the battery system and to cross-compare the inherent physical properties of these battery cells. A replacement battery cell may thus be identified based on a deviation of its inherent physical properties from a certain amount of other battery cells.

The above configuration based on cross comparison of inherent physical properties of battery cells advantageously allows to do completely without pre-stored reference values. This makes it more difficult for competitors to identify and/or to amend such reference values. Further, using inherent physical properties of other battery cells of a system for authentication of a first battery cell further allows for reflecting effects of cell aging and/or environmental conditions on the inherent physical properties of the battery cells. Hence, with the present embodiment, the use of computationally complex battery models and/or of extended measurement sequences may be omitted or reduced in determining the inherent properties.

According to another embodiment, the at least one reference value used for authenticating at least one battery cell is based on a mathematic cell model of the at least one battery cell. Such battery models are commonly used in the field to determine nominal values of battery cell properties for battery cell operation and control. According to this embodiment, such battery cell models are thus put to a new use of determining at least one reference value for an inherent physical property for battery cell authentication.

In an embodiment, the battery system further includes a storage module with the reference value for the inherent physical property, e.g., a plurality of reference values for inherent physical properties of multiple battery cells. The storage module may be a volatile or non-volatile memory, storing such at least one reference value temporarily or continuously. The storage module is preferably configured as part of the control unit thus allowing a central storage of reference value(s). Alternatively, each control module of the battery system may include such storage module for decentralized storage of reference values of inherent physical properties during operation of the system.

In another embodiment, the control unit may be configured to trigger the control module to perform a measurement sequence of voltage, current, and/or temperature measurements of the at least one battery cell. In the context of the present disclosure, a measurement sequence refers to a time series of measurements of at least one of current, voltage or temperature of a battery cell. Further, while measuring the time series, other values of the battery cell might be varied and/or signals may be input to the battery cell, e.g., by inputting or drawing a current to/from the cell. The measurement sequence may be designed to allow determination of a specific inherent physical property of at least one battery cell as described in detail below.

The measurement sequence may include voltage, current, and/or temperature measurements of at least two battery cells obtained during a predetermined time window. Further, the measurement sequence includes a first time series of voltage, current and/or temperature measurements at a first battery cell and a second time series of voltage, current and/or temperature measurements at a second battery cell, while the performed measurements are identical for the first time series and the second time series. By performing the measurement sequence on at least two battery cells in a predetermined time window, e.g., simultaneously, the comparability of the obtained values is guaranteed and/or improved. Further, measurements at more than two battery cells may be performed in one measurement sequence. This embodiment allows for a cross-comparison of inherent physical properties obtained in an identical manner for each of the compared battery cells and obtained with high precision.

The control unit may be configured to control a specified current draw from the at least one battery cell during the measurement sequence. A terminal voltage value of the at least one battery cell may be measured, while a specific current is drawn from the battery cell, e.g., a temporarily varying current may be drawn from the at least one battery cell. The control unit may be configured to control the drawn current by connecting one or more loads to the at least one battery cell, e.g., via a variable resistor, or by connecting a bleed resistor to the cell.

Further, the control unit may be configured to control a specified current input, e.g., a temporarily varying current input, to the at least one battery cell during the measurement sequence. In other words, the control unit might apply a constant or varying charging current to the at least one battery cell during the measurement sequence and might further measure a voltage of the at least one battery cell while inputting the charging current. This embodiment allows determining a DC or internal resistance of the cell.

According to another embodiment, the control unit may be further configured to control performance of an impedance spectroscopy on the at least one battery cell during the measurement sequence. In impedance spectroscopy, resistance and capacitance of a cell can be detected by applying a sinusoidal AC excitation signal to the cell, so an impedance spectrum is obtained by varying frequency over a defined range. The capacitance and resistance of the battery cell can be then calculated by measurement of the in-phase and out-of-phase current responses. Using impedance as an inherent physical property allows for a high level of security regarding the authentication of the at least one battery cell of the battery system.

According to another embodiment, a method of operating the battery system may include measuring voltage values, current values, and/or temperature values of at least one battery cell of the battery system. Such values may already be obtained during normal operation of battery cells and used for controlling and/or monitoring the performance of a common battery system. However, according to embodiments, an inherent physical property of the at least one battery cell is determined based on the measured values for electric current, electric voltage, and/or temperature of the battery cell. Further, according to embodiments, the determined inherent physical properties are then compared with reference values for the inherent physical properties and an authentication of the at least one battery cell is performed based on such comparison. By using inherent physical properties of battery cells for performing an authentication of at least one battery cell, the method allows for a reliable authentication of battery cells without the need to disclose any information used for such authentication. Further, if the authentication is performed using cross-comparison of inherent physical properties of multiple battery cells, the information for authentication might be completely buried in algorithms and difficult to identify.

The method may include determining a deviation between the reference value and the determined inherent physical property and one of the steps of authenticating the at least one battery cell, if the deviation is below a predetermined (first) threshold, and identifying the at least one battery cell as replacement battery cell, if the deviation is above a predetermined (second) threshold. The first and second threshold might be the same or different threshold values. The deviation might be determined as a difference between the determined value and the reference value of the inherent physical property. However, if the inherent physical property is represented as a graph, e.g., if the inherent physical property is temperature dependency or a time series of an inherent physical property of the battery cell, the deviation might be determined as a deviation between two graphs, e.g., by least-mean-squares or the like.

Further, the method may include performing a measurement sequence of voltage, current and/or temperature measurements of the at least one battery cell. Performing such measurement sequences allows to determine inherent physical properties that allow for a particular reliable authentication of a battery cell. Performing the measurement sequence includes at least one of measuring voltage, current and/or temperature values of at least two battery cells obtained during a predetermined time window, drawing a specific current from and/or inputting a specific current to the at least one battery cell, and performing an impedance spectroscopy on the at least one battery cell.

Another aspect of embodiments provides use of a control unit of a battery system, wherein the battery system includes a battery module having a plurality of battery cells and a control module connected to the battery cells and includes the control unit that is connected to the battery module and that is configured to communicate with the control module via a data line. The disclosed use of the control unit of such a battery system allows for determining an inherent physical property of a battery cell based on measurement values of voltage, current and/or temperature of at least one battery cell obtained by the control module, for comparing the determined inherent physical property with a reference value for the inherent physical property, and for performing an authentication of the one battery cell based on the comparison. As already set forth above, use of inherent physical properties of battery cells, e.g., time-series or temperature dependencies of physical properties of battery cells, allows for authenticating the battery cells. Hence, according to embodiments, measurement values that might be usually obtained in common battery systems can be used for an additional purpose in order to avoid illegitimate replacement of battery cells of a battery system.

Figure 1:
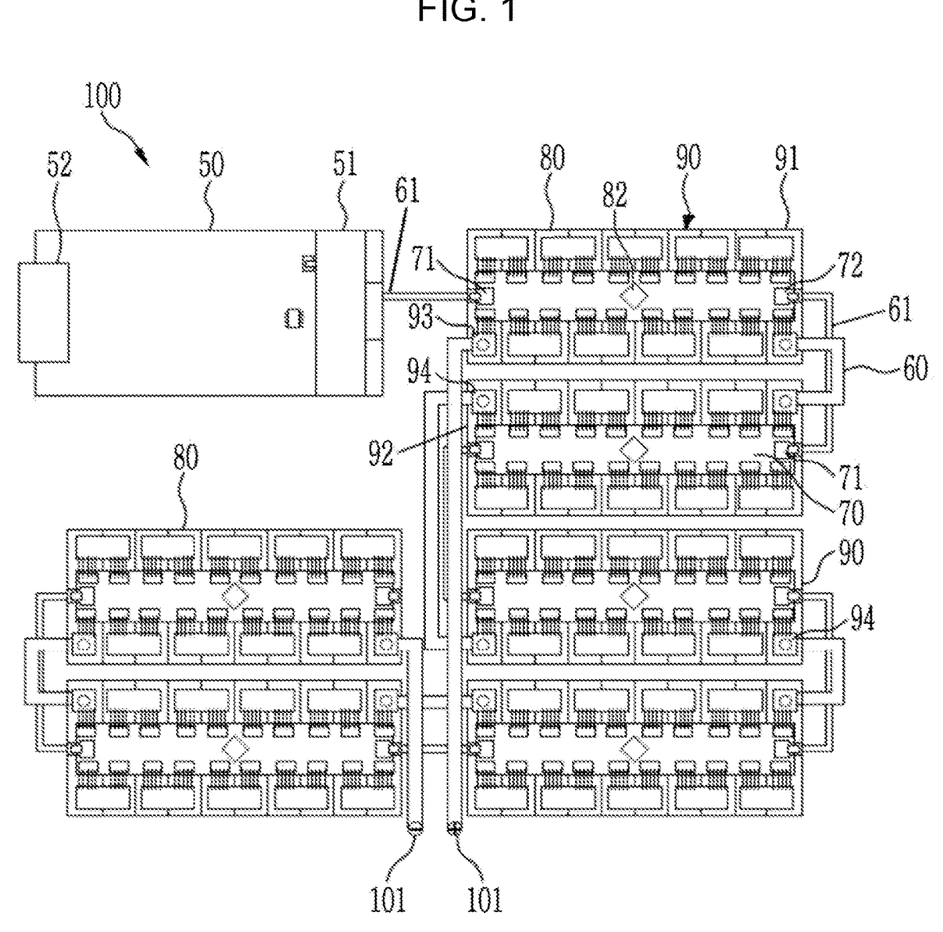
FIG. 1 illustrates a schematic top view of a battery system according to an embodiment.

FIG. 1 illustrates a schematic view of a battery system 100 according to an embodiment. Referring to FIG. 1, the battery system 100 may include a plurality of battery modules 90 that are electrically connected in series between a first system terminal 101 with positive polarity and a second system terminal 102 with negative polarity. Each battery module 90 may include a plurality of stacked prismatic battery cells 80. For example, ten stacked prismatic battery cells 80 may be arranged into five parallel connected pairs of battery cells 80 connected in series between a first module terminal 93 with positive polarity and a second module terminal 94 with negative polarity.

Each battery module 90 may further include a control module 70, i.e., a cell supervision circuit (CSC) 70, disposed on top of the stacked battery cells 80. Each CSC 70 may include a printed circuit board (PCB) as a circuit carrier with a plurality of contact pads, contact metallizations, and integrated circuits that are surface mounted to the carrier. The CSC 70 is electrically connected to the terminal of each battery cell 80 and is configured to monitor and balance the voltage of the individual battery cells 80. Particularly, the CSC 70 is configured to measure values of electric voltage (terminal voltage), electric current, and temperature of each battery cell 80. The CSC 70 may further include a plurality of resistors that are connectable to the individual cells 80 for passively balancing the battery module 90 by dissipating energy of the highest voltage battery cells 80. Each CSC 70 may further include a first signal port 71 and a second signal port 72 that are configured to interconnect the CSC 70 for data transmission.

The battery system 100 may further include a control unit 50, i.e., a battery management system (BMS) 50, that includes a vehicle (VEH) converter 52 for connecting the BMS 50 to a 12 V board net of an electric vehicle, and a high voltage (HV) connector 51 that is configured for safely connecting the voltage domain of the plurality of battery modules 90 to the voltage domain of the board net. The battery management system 50 is further configured for communication with electric consumers connected to the board net as well as with the battery modules 90 of the battery system 100.

For data communication, the BMS 50 is coupled to the battery modules 90 via a daisy chain configuration. In the daisy chain configuration, the BMS 50 is coupled via a pair of data lines 61 to the first signal port 71 of a first battery module 91 that is an outermost one of the battery modules 90, i.e., so the BMS 50 is connected to the first system terminal 101. The second signal port 72 of the first battery module 91 is coupled to a first signal port 71 of a second battery module 92, i.e., to a battery module of the battery modules 90 that is adjacent to the first battery module 91, via another pair of data lines 61. In other words, a two wire data communication line spans across the battery system 100 and in between the CSCs 70 of the battery modules 90.

In addition to the two wire data connection, the battery system 100 may include a plurality of busbars 60, some of which are electrically connected between a second module terminal 94 of the first battery module 91 and a first module terminal 93 of the second battery module 92. A single busbar 60 connects a first module terminal 93 of an outermost one of the battery modules 90 with the first system terminal 101 and another single busbar 60 interconnects a second module terminal 94 of an outermost one of the battery module 90 with the second system terminal 102. The busbars 60 realize power transmission of the battery cells 80 to the battery system terminals.

In addition, the battery system 100 may further include a heating element 82 that is thermally connected to at least one battery cell 80. For example, the heating element 82 may be a temperature sensor, e.g., a thermistor, which may be used as a heating element by applying a heating current thereto. In this case, the control unit 50 may vary a temperature of the battery cell 80 during the measurement sequence via the heating element 82. Many inherent physical properties of the battery cells 80 depend on the temperature of the battery cell 80 and hence by varying the battery cell 80 temperature during a measurement sequence, particularly characteristic inherent physical properties, such as a temperature dependency of an internal resistance, DC resistance or impedance may be determined as an inherent physical property.

Figure 2:
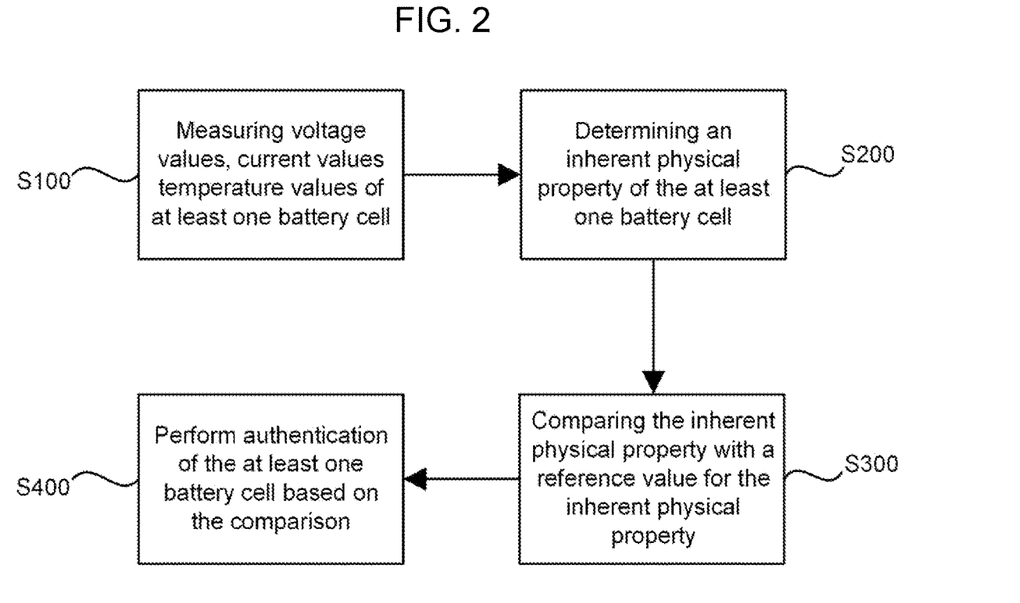
FIG. 2 schematically illustrates a method of operating a battery system according to an embodiment.

FIG. 2 schematically illustrates a method of operating the battery system 100.

Referring to FIGS. 1 and 2, in operation S100, the control unit 50 is configured to control each of the CSCs 70 to measure voltage values, current value, and temperature values of at least one battery cell 80 of the respective battery module 90. Therein, these measurements can be performed by the CSCs 70 specifically in preparation of an authentication of the at least one battery cells 80 or might be regularly obtained by the CSCs 70 during normal operation of the battery system 100.

Particularly, the control unit 50 controls each of the CSCs 70 via the data line 61 to perform a measurement sequence on at least one of the battery cells 80 of the respective module 90, such that the measurement sequence is performed simultaneously for the plurality of battery cells 80 of the battery system 100. The measurement sequence includes the detection of a time series of battery current and terminal voltage values for each of the measured battery cells 80, while a defined current, i.e., an AC current, is applied to each of the measured battery cells 80 within the multiple battery modules 90. Therein, the AC current signal is applied via the CSC 70 of the respective battery module 90. The detected values are either transmitted directly from the respective CSCs 70 to the control unit 50 via the data lines 61 or might be further processed by the CSCs 70.

Then, an inherent physical property is determined for each of the measured battery cells 80 based on the measured voltage and current values for this battery cell 80 in operation S200. The inherent physical property is preferably related to a frequency-dependent impedance of the respective measured battery cells 80 and can be considered as a fingerprint of the battery cells 80. If the inherent physical property of the measured battery cells 80 is determined directly by the CSCs 70 under the control of the control unit 50, the determined inherent physical properties are either transmitted from the respective CSCs 70 to the control unit 50 via the data lines 61 or are further processed, e.g., and stored, by the control modules 70.

In operation S300, the determined inherent physical properties are compared with reference values for the respective inherent physical properties. In the described embodiment, a cross-comparison between the inherent physical properties determined for the plurality of measured battery cells 80 is performed. This already allows to identify outliers of the inherent physical properties and to identify battery cells 80 that can be identified as replacement battery cells. Sometimes, only some battery cells 80 of the battery system 100 need to be replaced at a certain time and hence the inherent physical properties of those cells will differ from the inherent physical properties of the original cells 80 and can thus be used to identify the replacement battery cells. Further, in operation S300 the determined inherent physical properties are compared to reference values determined by a mathematical model of the battery cells 80, i.e., simulation of the battery cells 80. Eventually, only outliers of the cross-comparison are compared to the modelled reference values to save resources.

Operation S300 is performed by the control unit 50 based on the received or determined values of the inherent physical properties as well as based on reference values stored in or determined by the control unit 50. Alternatively, the comparison is performed by the CSCs 70 under the control of the control unit 50, e.g., by using reference values for the inherent physical properties that were transmitted to the CSCs 70 from the control unit 50.

Based on the comparison of the determined values and the reference values of the inherent physical properties performed in operation S300, authentication of the measured battery cells 80 is performed in operation S400. Therein, the battery cell 80 is identified as a replacement battery cell if a deviation between the determined value and the reference value of the inherent physical property exceeds a predetermined threshold. In such a case, a control signal might be generated and transmitted by the control unit 50 or might be received by the control unit 50 from the control module 70. Such control signal is preferably transmitted/forwarded to a control system of a vehicle including the battery system 100. Hence, a user can be informed of the replacement battery cell. Also, the battery system 100 may be put in a deactivated state in order to avoid any security risks due to operating the battery system 100 while a replacement battery cell is still disposed within the battery system 100. If a deviation between the determined value and the reference value of the inherent physical property is below a predetermined threshold, the respective measured battery cell 80 is preferably identified as an authentic OEM battery cell 80, i.e., is successfully authenticated.

Figure 3:
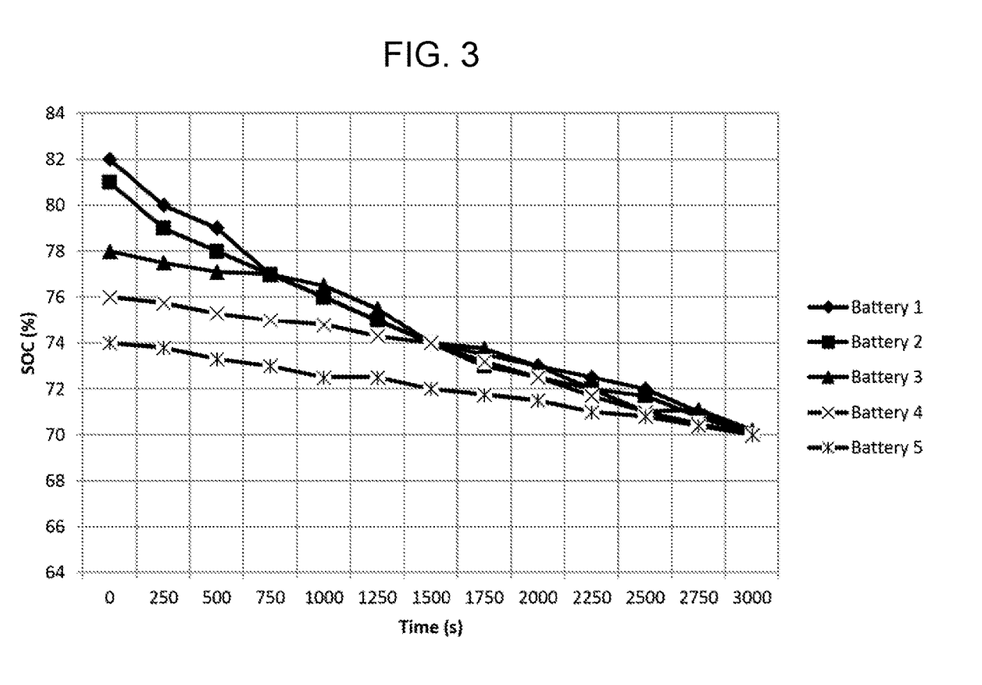
FIG. 3 illustrates the state of charge (SOC) over time for a plurality of battery cells.

FIG. 3 illustrates the state of charge (SOC) over time for the plurality of battery cells 80, particularly the SOC for batteries 1 to 5 of the battery cells 80 during a period between 0 s and 3000 s.

As one can see from FIG. 3, the time-dependency of the SOC differs for individual battery cells and hence the time dependency of a battery cell might be used as a fingerprint for a particular battery cell. However, at the same time for a plurality of similar battery cells, e.g., battery cells produced by the same original equipment manufacturer, the time dependencies of the SOC of the batteries 1 to 5 lies within a certain range as shown in FIG. 3. Hence, this range of SOC time dependency can be used as a reference value for an inherent physical property of the battery cells from this original manufacturer.

The electronic or electric devices and/or any other relevant devices or components according to embodiments described herein may be implemented utilizing any suitable hardware (e.g., a microcontroller), firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of carrier. The conducting elements may include metallization, e.g., surface metallizations and/or pins, and/or may include conductive polymers or ceramics. Further electrical energy might be transmitted via wireless connections, e.g., using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, RAM. The computer program instructions may also be stored in other non-transitory computer readable media such as, for example, a CD-ROM, flash drive, or the like.

By way of summation and review, the service life of the aforementioned control units, e.g., BMS and CSC, might exceed the service life of the controlled unit battery cell(s). Hence, in principle, control units that were introduced to the market by an original equipment manufacturer (OEM) might thus be reused with replacement unit battery cells once the original cells quit functioning. However, such reuse may not only amount to a commercial loss for the OEM but may also pose high risks for battery malfunctions. Control units and battery cells are usually perfectly coordinated and hence using replacement unit battery cells may increase the risk of malfunctioning of the battery system and, in a worst case, might lead to fire, explosions, and/or release of harmful substances. Hence, use of replacement unit battery cells should be minimized.

Common measures to enable users to identify original unit battery cells include use of secure elements, e.g., holograms, barcodes, RFID transmitters or the like, fixedly connected with original unit battery cells. However, in order to guarantee a verification of those secure elements, they need to be principally accessible, either optically or by electromagnetic transmission. However, this makes it possible to identify and to copy such secure elements. It is further known, to publish technical specifications of battery cells, such as detailed size, weight, material composition etc. in order to enable an identification of replacement battery cells. However, also in this method any information used for authentication must be made publicly available and can thus be illegitimately used to design replacement cells.

In contrast, according to embodiments, a battery system and a method of operating a battery system allow for authenticating of at least one battery cell of the battery system without the need to disclose or reveal any information used for the authentication. That is, according to embodiments, the battery system allows for the authentication of battery cells of a battery system by determining inherent physical properties of the battery cell and by comparing them to reference values for such inherent physical property. In other words, by using one or more of the inherent physical properties, as well as time-dependencies, temperature dependencies, or cross-correlation of these properties, a fingerprint of an original battery cell can be determined and used for authentication.

The inherent physical properties may be advantageously used for authentication of original battery cells without the need of using additional physical or electronic identifiers that can be identified and copied by competitors of the OEM. In fact, the only way to achieve similar inherent physical properties of the replacement battery cells would be to build them identically to the OEM battery cells which is however detrimental to the business model of the competitors. Further, the inherent physical properties that may be used for authentication of original battery cells are manifold and would be difficult for a competitor to identify the inherent physical properties used for authentication. Further, distributing the task of authenticating battery cells between a control unit, e.g., a BMS, of a battery system and control module(s), e.g., CSCs, of battery modules, makes it more complicated to analyze the authentication procedure by reverse engineering. Therefore, by combining the use of variable inherent physical properties with a distributed computing infrastructure of a battery system, example embodiments provide a high level of security against battery cell replacement by providing a reliable cell authentication.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system for an electric vehicle, the battery system comprising:
   a plurality of battery modules, each of the plurality of battery modules including:
      battery cells, and
      a controller module on the battery cells, the controller module being electrically connected to each of the battery cells, and the controller module being configured to measure voltage values, current values, and temperature values of each of the battery cells; and
   a controller unit connected to each of the plurality of battery modules and configured to communicate with the controller module of each of the plurality of battery modules via at least one corresponding data line, the controller unit being configured to determine at least one inherent physical property of each of the battery cells based on the measured values of the controller module, to cross-compare the determined inherent physical properties of all the battery cells to each other, and to perform an authentication of each of the battery cells based on the cross-comparison without using pre-stored reference values.

2. The battery system as claimed in claim 1, wherein the controller unit is further configured to determine a deviation between the determined inherent physical properties and to authenticate each of the battery cells if the deviation is below a predetermined threshold.

3. The battery system as claimed in claim 2, wherein the controller unit is further configured to determine a deviation between the determined inherent physical properties and to identify each of the battery cells as a replacement battery cell, if the deviation is above a predetermined threshold.

4. The battery system as claimed in claim 1, wherein the controller unit is further configured to trigger the controller module to perform a measurement sequence of voltage, current, and temperature measurements of each of the battery cells.

5. The battery system as claimed in claim 4, wherein the measurement sequence includes simultaneous voltage, current, and temperature measurements of at least two battery cells obtained during a predetermined time window.

6. The battery system as claimed in claim 4, wherein the controller unit is further configured to control a specified current draw from and/or a specified current input to each of the battery cells during the measurement sequence.

7. The battery system as claimed in claim 4, wherein the control unit is further configured to control performance of an impedance spectroscopy on each of the battery cells during the measurement sequence.

8. The battery system as claimed in claim 4, further comprising a heating element thermally connected to each of the battery cells, the controller unit being configured to vary a temperature of each of the battery cells during the measurement sequence via the heating element.

9. The battery system as claimed in claim 1, wherein the inherent physical property includes at least one of an internal resistance, an impedance, a state of charge, a state of health, and a reaction dead time of each of the battery cells.

10. A method of operating a battery system, the method comprising:
   measuring voltage values, current values, and temperature values of each battery cell of a plurality of battery cells of a battery module in the battery system via a controller module on the plurality of battery cells, the controller module being electrically connected to each of the plurality of battery cells;
   determining an inherent physical property of each battery cell of the plurality of battery cells via a controller unit, based on the measured values of the controller module, the controller unit being connected to the battery module and configured to communicate with the controller module via a data line;

cross-comparing the determined inherent physical properties of all the plurality of battery cells to each other; and performing authentication of each battery cell of the plurality of battery cells based on the cross-comparison without using pre-stored reference values.

11. The method as claimed in claim 10, further comprising:

determining a deviation between the determined inherent physical properties;

authenticating each battery cell, if the deviation is below a first predetermined threshold; and identifying each battery cell as a replacement battery cell, if the deviation is above a second predetermined threshold.

12. The method as claimed in claim 11, further comprising performing a measurement sequence of voltage, current, and temperature measurements of each battery cell.

13. The method as claimed in claim 12, wherein performing the measurement sequence includes at least one of:

measuring voltage, current, and temperature of at least two battery cells obtained during a predetermined time window;

drawing a specific current from and/or inputting a specific current to each battery cell; and performing an impedance spectroscopy on each battery cell.

14. A controller of a battery system that includes a battery module with battery cells and a control module connected to the battery cells, the controller comprising:

a control unit connected to the battery module and configured to communicate with the control module via a data line, wherein the control unit is configured to determine an inherent physical property of each of the battery cells based on measurement values of voltage, current, and temperature of each of the battery cells obtained by the control module, to cross-compare the determined inherent physical properties to each other, and to perform an authentication of each of the battery cells based on the cross-comparison without using pre-stored reference values.

* * * * *